United States Patent
Qiao et al.

(10) Patent No.: US 7,042,906 B2
(45) Date of Patent: May 9, 2006

(54) METHOD TO CONTROL A SPECIAL CLASS OF OBS/LOBS AND OTHER BURST SWITCHED NETWORK DEVICES

(75) Inventors: Chunming Qiao, E. Amherst, NY (US); John Staley, Dallas, TX (US)

(73) Assignee: Brilliant Optical Networks, Dallas, TX (US)

( * ) Notice: Subject to any disclaimer, the term of this patent is extended or adjusted under 35 U.S.C. 154(b) by 943 days.

(21) Appl. No.: 10/097,227

(22) Filed: Mar. 13, 2002

(65) Prior Publication Data

US 2002/0141350 A1 Oct. 3, 2002

Related U.S. Application Data

(60) Provisional application No. 60/279,315, filed on Mar. 28, 2001.

(51) Int. Cl.
 *H04L 3/16* (2006.01)

(52) U.S. Cl. .................................... 370/468; 370/414
(58) Field of Classification Search ................ 370/412, 370/414, 416, 418, 468
 See application file for complete search history.

(56) References Cited

U.S. PATENT DOCUMENTS

| | | | |
|---|---|---|---|
| 6,804,255 B1 * | 10/2004 | Zheng et al. | 370/468 |
| 2002/0054732 A1 * | 5/2002 | Zheng | 385/24 |
| 2002/0154360 A1 * | 10/2002 | Liu | 359/135 |

* cited by examiner

*Primary Examiner*—Chi Pham
*Assistant Examiner*—Tito Pham

(57) ABSTRACT

The invention is an unique control method that maintains the bandwidth efficiency of Optical Burst Switched, Labeled Optical Burst Switched, and other burst or packet switched networks. The invention also combines in a novel manner the delayed Reserve-a-Fixed-Duration (RFD) class of switching techniques and special classes of slow Switching Elements.

7 Claims, 4 Drawing Sheets

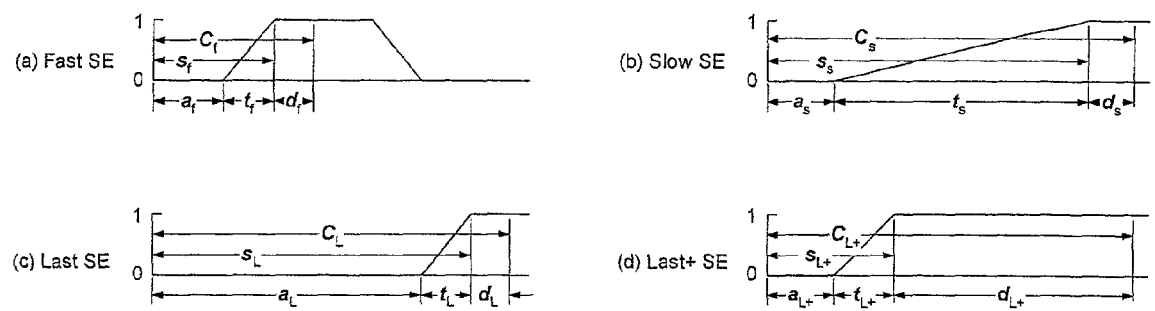
Figure 1 (a),(b),(c),(d).   Fast, Slow, Last and Last+ Switching Element behaviors.

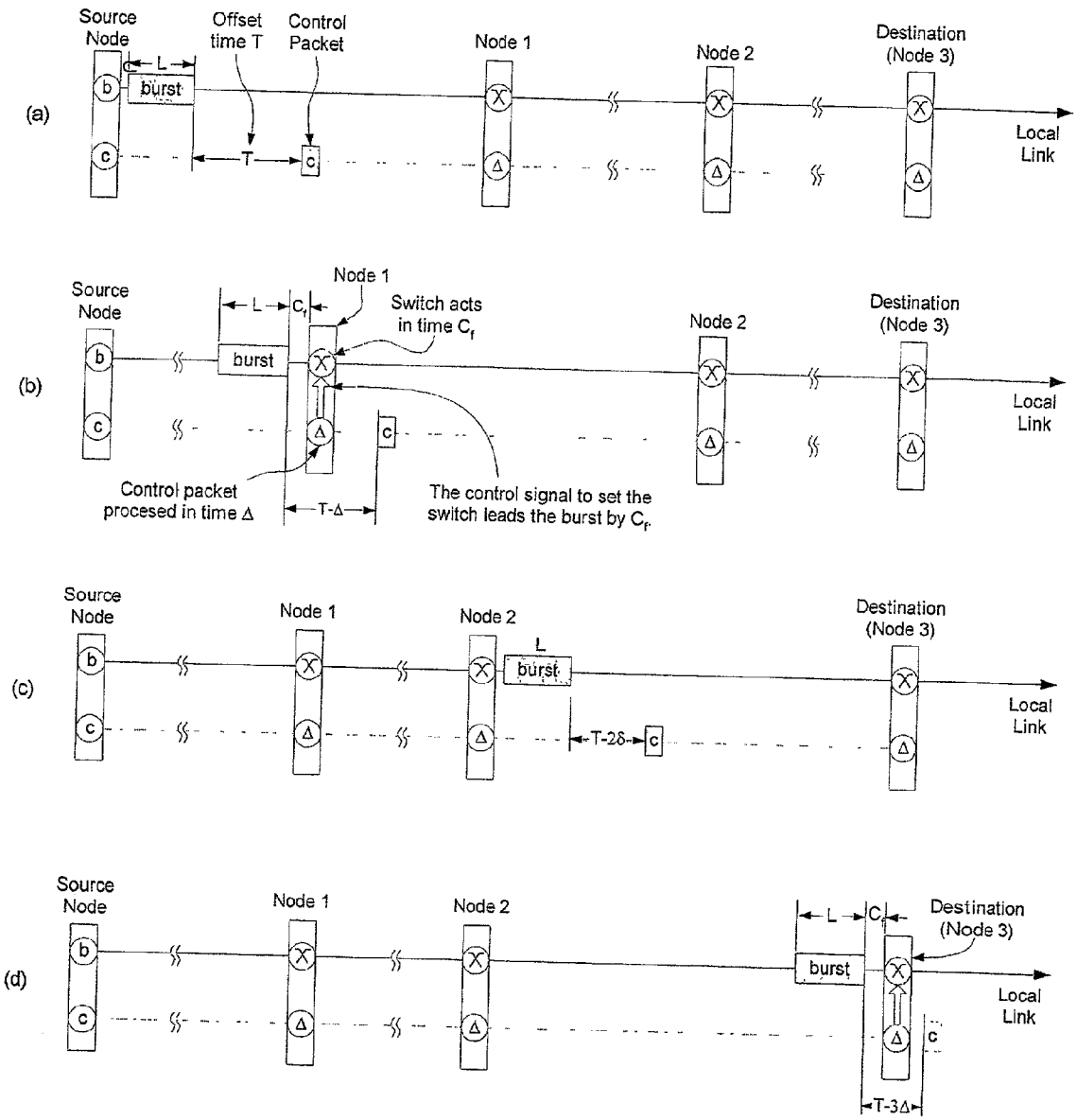
Figure 2 (a),(b),(c),(d). A three hop burst communication example.

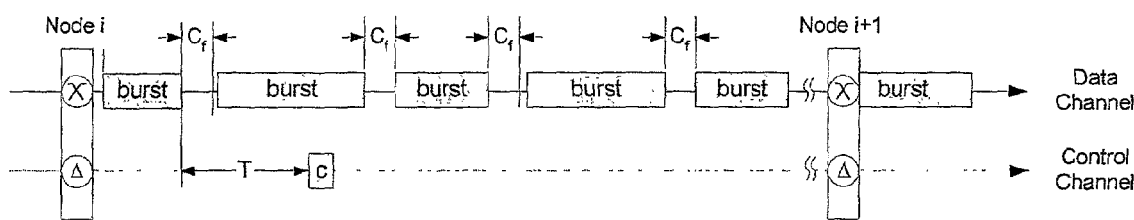
Figure 2(e). Using conventional control methods, bursts maintain a separation distance of C or more in order to allow the switch enough time to reconfigure between burst arrivals. Fast switches with short $C_f$ allow for tight burst-to-burst packing and thus high bandwidth efficiency.

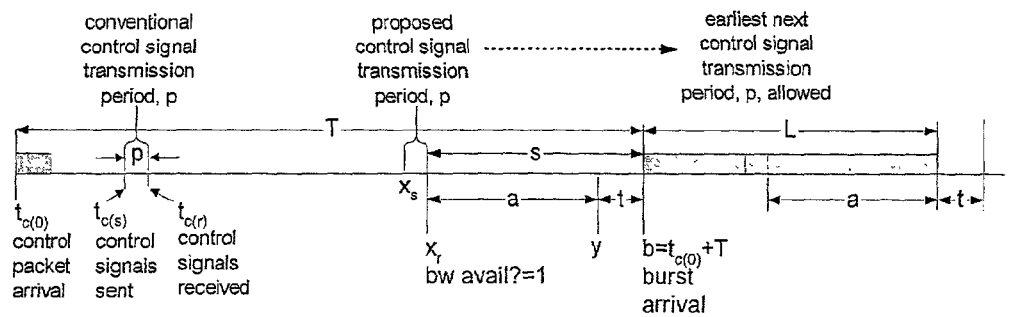
Figure 3(a)     Timing diagram to illustrate the proposed SE control method.
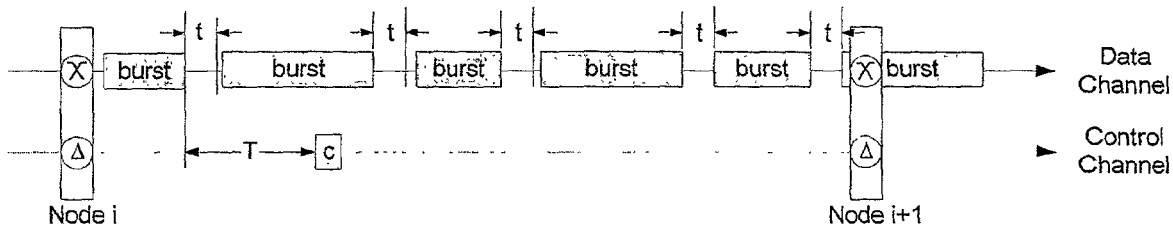
Figure 3(b). When applying the proposed control method to LAST or LAST+ switches, bursts maintain a separation distance of $t$ or more in order to allow the switch to reconfigure between bursts.

METHOD TO CONTROL A SPECIAL CLASS OF OBS/LOBS AND OTHER BURST SWITCHED NETWORK DEVICES

REFERENCE TO RELATED APPLICATIONS

This application claims the filing date of Provisional Patent Application No. 60/279,315 filed on Mar. 28, 2001.

FIELD OF THE INVENTION

This invention relates to the application of unique control methods to a special class of functional devices while maintaining the bandwidth efficiency of Optical Burst Switched, Labeled Optical Burst Switched, and other burst or packet switched networks.

BACKGROUND OF THE INVENTION

Internet network traffic exhibits large transient spikes in traffic loads independent of the number of individual data flows that have been aggregated together into a larger single flow. Such behavior is said to be "bursty" and fractal, as the pattern of demand remains self-similar at all scales of aggregation. Packet switching networks are capable of carrying bursty traffic efficiently since they can switch network bandwidth dynamically on a packet-by-packet basis, and therefore are able to provision the needed bandwidth to handle a burst of traffic, typically within a few nanoseconds or less. Circuit switched networks, on the other hand, are not bandwidth efficient in carrying bursty traffic since they can only make relatively long lived (typically on the scale of a millisecond or longer) bandwidth allocations and so cannot switch bandwidth quickly in response to a traffic burst. Burst switched networks (wherein a burst is the concatenation of one or more packets of variable length), like packet switched networks, can be bandwidth efficient in carrying bursty traffic as they too are capable of switching bandwidth within a small timescale. In order to realize this bandwidth efficiency for bursty traffic, conventional packet switching and burst switching networks require the use of fast switches to switch traffic at network nodes.

BRIEF DESCRIPTION OF PRIOR ART

Switching traffic at a network node, in the instant context, is the act of transferring physical data flows on an incoming communication link onto one or more outgoing communication links. In general, a switching element (SE), receives a control signal that causes the switching element to physically transition from an initial connection state to a desired final connection state. To aid in our discussion, we will make the following definitions with respect to such a switching element (see FIGS. 1 (a), (b), (c) and (d)):

Activation of a switching element (SE) (which is a component inside a switching fabric) or a switching fabric in general: The act of sending a control signal to configure the SE to a different state (or as pertains to our example below, to establish a new input to output connection);

Activation time (a): The time for a SE to start the transition process after a control signal is received by the SE. During this period, the existing states (connections) are stable/usable;

Control Signal Propagation Time (p): The elapsed time from when a control signal to change an SE's state is sent to an SE until the time the control signal is received by the SE;

Switching time (s): The elapsed time from when a control signal to change an SE's state is received by the SE, until the time at which the SE has reached the new state (new connection) which is stable/usable. Any timing jitters or duration uncertainties which might exist in the switching process is included within this Switching time s;

Transition and transition time (t): The difference between the switching time and the activation time, i.e., t=s−a;

Minimum dwell time (d): The time the SE has to dwell at a newly configured state (connection) during which the state (connection) is stable/usable and data can be transferred, before another control signal to change state can be received. The actual amount of time a SE can stay at a configured state to transfer data can be much longer than d;

Switching (duty) cycle time (c): The minimum possible interval between two consecutive activations of a SE. C=a+t+d=s+d.

Switching efficiency: Let the time used to transfer data after each transition be L (where d<=L) then the maximum efficiency achievable is E=L/(L+s) if no data is transferred during activation (as is done using existing switch control methods) and E'=L/(L+t) otherwise (using the novel SE control mechanism to be described later) and E'>=E. Everything else being equal, a higher switching efficiency would lead to a higher bandwidth utilization and network throughput;

Fast SE: A SE whose switching cycle time $C_f$ is relatively short, e.g., on the order of nanoseconds or less. Such a SE is able to switch packets/cells with good switching efficiency (see FIG. 1 (a));

Slow SE: A SE whose switching cycle time, $C_S$, is relatively long, e.g., on the order of microseconds to milliseconds or longer. Typically, a slow SE has a long $t_S$ as shown in FIG. 1(b). An example of a Slow SE is a Micro Electro Mechanical System (MEMS) switch. MEMS switches are useable in optical circuit-switching networks and can achieve a good switching efficiency (E) in such networks. However, if these switches are used in conjunction with conventional control methods in packet or burst-switching networks, where L is short, the efficiency will be unacceptably low.

A slow SE may be further categorized into the following two classes:

Long Activation with Short Transition (LAST) Slow SE: A SE whose activation time $a_{last}$ is long (could be as long as $t_S$) but whose transition time $t_{last}$ is short (could be as short as $t_f$) (See FIG. 1c) and LAST+Slow SE: A SE whose activation time $a_{last+}$ and transition time $t_{last+}$ are both short but whose dwell time $d_{last+}$ is long (see FIG. 1 (d)).

FIG. 2 (a), through (d), illustrate a typical Burst Switched network communication path which has been arbitrarily chosen to have three hop bursts, (i.e., number of Hops (H)=3). For simplicity, it is also assumed that the maximum processing time of a control packet at each node, which includes the time to generate a control signal for the switch at the node is Δ and schedule its transmission is Δ. Using conventional control methods, fast switches with switching cycle times of $C=C_f$ are needed in order to achieve a high switching efficiency. In FIG. 2(a), a control packet is sent on a control channel (e.g., a wavelength) followed by a burst of length L on a separate data channel after an offset time T. In FIG. 2(b), the control packet after reaching Node 1, is processed in time Δ and retransmitted to Node 2 so that the offset between the control packet and the data burst is reduced to T−Δ. The Node 2 processor (which includes a switch controller) learns from the control packet when the burst will arrive and delays sending a switch control signal until there is only just enough time (equal to C) left for the switch to receive the control signal and configure itself before the leading edge of the burst reaches the switch. Such a delay in sending the control signal is to allow this delay period bandwidth to be used by one or more preceding bursts which have either already arrived, or are expected to arrive and finish passing through the switch before the switch must transit to a new state to serve the incoming burst. In FIG. 2(c), the time delay between the control packet and the burst is reduced to T−2Δ. In FIG. 2(d), the burst the time delay between the control packet and the burst is TΔ which must still be greater than C. At the destination node, the burst is directed to a local link. In general, for a pathway traversing H hops, the time delay between the control packet and the burst, T, must be no less than $C_f$+HΔ.

While it is known in the art that multiple bursts can be statistically multiplexed onto a single output link, sequential bursts sharing a common channel must maintain separations of C or more in order to allow the switch sufficient time to reconfigure prior to the arrival of the next burst. See FIG. 2(e). In this conventional configuration, if LAST or LAST+ switches (which have a large C) are used, the switching efficiency will be unacceptably low.

It is, therefore, an object of the invention to achieve a switching efficiency for switching packets/bursts using LAST or LAST+ switches which is as high as that achievable from using fast SEs controlled by conventional methods.

SUMMARY OF INVENTION

The above and related objects are achieved by providing unique control methods that maintain the bandwidth efficiency of Optical Burst Switched, Labeled Optical Burst Switched, and other burst or packet switched networks. The invention also combines in a novel manner the delayed Reserve-a-Fixed-Duration (RFD) class of switching techniques (such as those used in Just-Enough-Time (JET) protocol controlled OBS networks), and the two special classes of slow Switching Elements called LAST and LAST+.

While the exemplary device discussed below shall be a switching element operating in an asynchronous manner in a LOBS network, this invention pertains to all functional devices which exhibit a special behavior that in conjunction with novel control methods, deliver unique burst switching benefits. These functional devices can include but are not limited to: tunable wavelength converters, tunable lasers, fiber delay lines (FDLs) or other optical delay devices, tunable attenuators, configurable polarization control devices, configurable wavelength dispersion control devices, configurable polarization mode dispersion control devices, configurable phase control devices, tunable filters, configurable optical add/drop multiplexers, configurable optical multiplexers/demultiplexers, and any other optical or electronic functional device operating synchronously or asynchronously, as may be used in any Burst Switched network whether of an optical, electronic, wireless, Optical Wavelength Division Multiplexed, Code Division Multiplexed, Labeled, Subcarrier Multiplexed or any other network control paradigm that relies on reservation based burst communication control techniques.

DESCRIPTION OF DRAWINGS

FIG. 1 (a)–(d) depicts Fast, Slow, LAST and LAST+ switching element behaviors, respectively.

FIG. 2 (a)–(d) depicts a three hop burst communication example.

FIG. 2 (e) depicts data bursts transmitted with a separation distance of C or more under conventional methods.

FIG. 3(a) depicts the invention's Switching Element control method.

FIG. 3(b) depicts data bursts maintaining a separation distance of t or more under the invention's control method.

DETAILED DESCRIPTION OF INVENTION

In transmissions over an OBS or LOBS packet switching network, a control packet is transmitted first, followed by a data burst which is sent after an (initial) offset time T. (The value of T, which is carried by the control packet, will be discussed below). Each control packet will be time-stamped when it arrives at an intermediate node, but may or may not be processed by the node immediately. The control packet, in addition to the offset time, also includes other information such as addressing information (e.g., a label) and possibly the channel (wavelength) to be used by the burst to reach the next hop. As described earlier, the offset time will be adjusted down after the control packet is processed at each hop. From processing the control packet, an intermediate node decides the appropriate output for the control packet and the corresponding burst, determines if bandwidth is available at the output when the burst arrives, and if so, generates the appropriate control signals used to set/configure the Switching elements so the following burst will be switched to an appropriate output port.

The appropriate output channel to be used by the burst (subject to bandwidth availability to be described later) is dependent on the input channel (wavelength) used by the data burst and whether the node can convert that wavelength to a different wavelength at the output port at the node. Without the wavelength conversion capability, the output channel has to be the same; otherwise, it can be any wavelength that the input one can be converted to.

Specifically, the following operations are performed on each control packet at an intermediate node, which for simplicity, is assumed to be bufferless but has full channel (wavelength) conversion capabilities:

1) Given the input port at which the control packet arrived and the control information (e.g., a label) carried by the control packet, determine the output port for the control packet (and the corresponding burst) as well as the new control information (e.g. a new label) to be carried by the control packet (by looking up a label switching table at the node);

2) Determine if bandwidth during a certain period (as to be specified later) at the output can be reserved successfully and (a) if successful, blocks other control packets from reserving the bandwidth during that period; (b) if unsuccessful, perform one or more operations on the control packet (and the incoming burst) to resolve contention such as burst dropping, and deflection routing.

3) Reserve the bandwidth (by completing book-keeping tasks required to maintain the data structure used to represent the bandwidth availability/usage information), and 4) Determine how to set/configure the SEs (and the switch in general), including wavelength converters—specifically, what the control signals that should be generated and sent should be for the SE/switch so that the burst will be switched to the output channel,
5) Generate those switching element control signals and
6) Schedule the transmission of those switching element control signals (either immediately or at a later time).

If the switch has limited FDLs (consisting of an array of FDLs arranged in parallel, feed-forward or feed-backward/re-circulating fashion), whether an incoming burst can use the FDL or not when there is NO bandwidth available on the output channel during the desired period is also determined during step 2(b), with the actual reservation of the FDL capacity done in step 3, and the generation and scheduling of the control signals to be sent to the FDL array controller done thereafter in steps 4 through 6.

Let $\Delta$ be the (maximum) time to complete the above six steps. Using existing approaches known in the art for OBS/LOBS, the control packet is relayed to the next hop after $\Delta$ units (i.e. after finishing the control operations described above). Hence, if the path for the control packet/burst to take has H hops, and the maximum time to finish the above steps at each intermediate node is $\Delta$, the minimum offset time T needed is $H \times \Delta + s$, where s is the switching time.

The invention provides a novel method of scheduling the transmission of these switching element control signals (step 6 above). The invention further provides a method that can switch the bursty traffic with good efficiency in OBS and LOBS networks, even if LAST and LAST+ slow switches are used.

The following discussion, illustrated in FIG. 3 below, assumes that the bandwidth is available at an appropriate output channel and the switch is strictly non-blocking in that as long as an output channel is free, one can set/configure the switch to connect any input to that output without disturbing any existing connections.

Let the arrival time of the control packet at an intermediate node be $t_c(0)$ and the time at which the control signals for the switch are sent by the switch controller and received by the switch be $t_c(s)$ and $t_c(r) = t_c(s) + p > t_c(0)$, respectively. Note that the corresponding data burst will arrive at time $b = T + t_c(0)$, where T is the value of the offset time carried by the control packet prior to any adjustment at this hop. It should be large enough such that $b > t_c(r) + s$ at each and every node.

Given a LAST switch, the conventional method is to transmit the control signals to SEs at $t_c(s)$, which is between $t_c(0) + \Delta$ and $b - C - p$, and it is necessary to make sure that the bandwidth on the desired output channel is available starting at time $t_c(r)$ (or shortly after that) in order to avoid data loss or corruption on the output channel.

Under the novel method of the invention, the operation of switching set-up configuration (that is, the transmission of the control signals to SEs) is scheduled to start at time $xs = b - s - p$ (which is larger than $t_c(s)$) such that the desired input-output connection is ready right before the burst arrives—and it is only necessary to make sure that the bandwidth on that output channel will be available by time $y = b - t$ for a period of $(L+t)$ units. As can be seen from FIG. 3, this will not cause data loss or corruption on the output channel. Because $y - xr = a$ is large (microseconds or even milliseconds) for a LAST switch, and $y - t_c(r)$ can be even larger in an OBS/LOBS network due to the use of an offset time, the bandwidth saving and switching efficiency can be improved significantly over the conventional methods for controlling the LAST switches. In fact, if t is as short as that of a fast switch, one can achieve the same efficiency as that achievable using fast switches by applying the proposed method to LAST and LAST+ switches. More specifically, using the method of the invention, sequential bursts sharing a common channel only require a minimum separation of t which, when using LAST and LAST+ slow switches, can be as tight as that achievable when using fast switches (see FIG. 3(b)), resulting in high efficiency.

Note that since switch control signals must maintain a minimum separation of t, achieving a good efficiency requires a minimum burst length no shorter than the smaller of t and d. In particular, for LAST+ switches, the burst length L needs be longer than $d_{LAST+}$. In such a case, the transmission of the next control signal may be sent at time $b+L-a-p$ (such that the signal is received a units before the burst leave the SE).

The above method also applies to nodes with buffer (or limited FDLS) for the burst. Specifically, assume that the bandwidth during $(b-t, b+L)$ is not available at any appropriate channel, but the burst may be delayed, (using for example FDLs), for a finite set of possible values, d1, d2, . . . . and dm, where $d1 <= d2 <= \ldots <= dm$. The node first finds a minimum $1 <= i <= m$ such that one of the appropriate channel will have bandwidth available during $(b-t+di, b+di+L)$, then schedule the transmission of the control signals to the SE that switches the burst from the FDL array to the output port to start at $(b+di-s-p)$ In addition, if another SE whose switching time, s', is used to switch the incoming burst to the appropriate FDL, and p' is the propagation delay between the switch controller and such an SE, the control signal can be scheduled to start transmitting to such an SE at $(b+di-s'-p')$ Although the present invention and its advantages have been described in the foregoing detailed description and illustrated in the accompanying drawings, it will be understood by those skilled in the art that the invention is not limited to the embodiment(s) disclosed but is capable of numerous rearrangements, substitutions and modifications without departing from the spirit and scope of the invention as defined by the appended claims.

We claim:

1. A method for the control of burst switched networks and network devices, wherein any path along which a given control packet and corresponding burst traverses is composed of at least one initial node, at least one final node and zero or more intermediate nodes, and wherein for controlling transmission of data bursts by network devices in a burst switched network, each of said data bursts transmitted being preceded by a corresponding control packet which is transmitted ahead by an offset time, said method comprising the steps of:
   a) generating or receiving a control packet at an a control packet input port of a network node and processing the control packet to determine a control packet output port, and a data burst input port and data burst output port for the control packet and the corresponding data burst corresponding to said control packet;
   b) determining if bandwidth for the data burst at the data burst output port can be reserved successfully and if so, blocking other control packets from reserving the bandwidth, and proceeding to step d);
   c) if bandwidth at the determined data burst output port can not be reserved, performing bandwidth contention management and repeating step b);

d) transmitting said control packet out the determined control packet output port to the next node;

e) reserving the bandwidth at the determined data burst output port;

f) determining how to configure the switching elements in the node to direct said corresponding data burst from the determined data burst input port to the determined data burst output port and generating switching element control signals to configure said switching elements to the determined new connections;

g) without disturbing any pre-existing connections of the switching elements in the node until said new connection is made, scheduling the transmission of said switching element control signals to start at a scheduled starting time, said scheduled starting time being delayed from the completion of step f) until a time no later than immediately prior to said control signal's transmission period and the time required for the switching elements to receive the control signal and switch to the new connection, so that the new connection is ready for transmission of the corresponding data burst from the data burst input port to the data burst output port immediately prior to the data burst arriving at the data burst input port;

h) at said scheduled time, transmitting said switching element control signals to the switching elements in the node and switching the switching elements to the new connection.

2. The method of claim 1, wherein said step of determining if bandwidth at the determined output port can be reserved successfully for the data burst is performed by looking up a label switching table.

3. The method of claim 1, wherein during said step of determining if bandwidth for the data burst at the output port can be reserved successfully comprises:

ensuring that the bandwidth on said output port will be available from a fixed time prior to the arrival of the data burst, for a fixed period of time.

4. The method of claim 3, wherein said fixed time is the time difference between an elapsed time from when a control signal is received by the switching elements until the switching element has made a new connection, and the elapsed time from when a control signal is received by the switching elements until the switching element starts the transition process to the new connection.

5. The method of claim 3 or 4, wherein said fixed period of time is a period beginning from said fixed time prior to the arrival of the data burst and includes the longer of a) the time needed to transfer a data burst after the output port makes said new connection, or b) the time that the switching elements must dwell at their current connection before they can begin a transition to a new connection.

6. The method of claim 1, wherein said scheduled starting time for the transmission of the control signal is no later than a fixed period prior to the arrival of the of the data burst;

said fixed period being the time needed for the control signal to propagate, plus the time from when the control signal reaches the switching element until the switching element has made a new connection.

7. The method of claim 6 which is applied to network nodes with at least one buffers, wherein said fixed period prior to the arrival of the data burst includes delay times when the data burst is held in buffers.

* * * * *